US011303696B2

(12) United States Patent
You et al.

(10) Patent No.: US 11,303,696 B2
(45) Date of Patent: Apr. 12, 2022

(54) METHOD, APPARATUS, AND SYSTEM FOR SELECTING MEC NODE

(71) Applicant: Tencent Technology (Shenzhen) Company Limited, Guangdong (CN)

(72) Inventors: Zhiqiang You, Shenzhen (CN); Jiajia Lou, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/320,500

(22) Filed: May 14, 2021

(65) Prior Publication Data
US 2021/0273987 A1 Sep. 2, 2021

Related U.S. Application Data

(63) Continuation of application No. PCT/CN2020/084892, filed on Apr. 15, 2020.

(30) Foreign Application Priority Data

May 10, 2019 (CN) .......................... 201910387647.7

(51) Int. Cl.
*H04L 29/06* (2006.01)
*H04L 29/08* (2006.01)
(Continued)

(52) U.S. Cl.
CPC .......... *H04L 67/02* (2013.01); *H04L 61/1511* (2013.01); *H04L 61/2007* (2013.01); *H04L 67/1014* (2013.01)

(58) Field of Classification Search
USPC .......................... 709/203, 227, 228, 229, 238
See application file for complete search history.

(56) References Cited

U.S. PATENT DOCUMENTS

2006/0106934 A1* 5/2006 Figaro .................. H04L 45/586
709/227
2019/0037474 A1* 1/2019 Xu ........................ H04W 64/00
(Continued)

FOREIGN PATENT DOCUMENTS

CN 109275160 1/2019
CN 109640348 4/2019
(Continued)

OTHER PUBLICATIONS

International Search Report dated Jul. 15, 2020 in PCT Application No. PCT/CN2020/084892 (with English Translation).
(Continued)

*Primary Examiner* — Jude Jean Gilles
(74) *Attorney, Agent, or Firm* — ArentFox Schiff LLP

(57) ABSTRACT

In a method for selecting a mobile edge computing (MEC) node that performed by an edge cloud gateway, a first HyperText Transfer Protocol (HTTP) service request forwarded by the UPF is received by processing circuitry of the edge cloud gateway. A destination address of the first HTTP service request is an edge-application virtual Internet Protocol address (VIP). A corresponding MEC processing server is determined according to the first HTTP service request and a preset offloading policy, and the first HTTP service request is offloaded to the corresponding MEC processing server. The edge cloud gateway is disposed in a system for selecting a MEC node, such that the system includes at least a user plane function (UPF) and the edge cloud gateway.

20 Claims, 5 Drawing Sheets

(51) Int. Cl.
*H04L 29/12* (2006.01)
*H04L 67/02* (2022.01)
*H04L 61/4511* (2022.01)
*H04L 61/5007* (2022.01)
*H04L 67/1014* (2022.01)
*G06F 16/953* (2019.01)
*G06F 15/16* (2006.01)
*G06F 15/173* (2006.01)

(56) References Cited

U.S. PATENT DOCUMENTS

| | | | | |
|---|---|---|---|---|
| 2019/0140933 | A1* | 5/2019 | Guim Bernat | H04L 43/16 |
| 2019/0141536 | A1* | 5/2019 | Bachmutsky | H04W 12/08 |
| 2019/0364456 | A1 | 11/2019 | Yu | |
| 2020/0195495 | A1* | 6/2020 | Parker | H04M 15/8038 |
| 2020/0267518 | A1* | 8/2020 | Sabella | H04W 12/06 |
| 2020/0296187 | A1* | 9/2020 | Sabella | H04W 4/40 |
| 2020/0336258 | A1* | 10/2020 | Zhu | H04L 1/0076 |

FOREIGN PATENT DOCUMENTS

| | | |
|---|---|---|
| CN | 110198363 | 9/2019 |
| WO | WO 2018/165934 A1 | 9/2018 |

OTHER PUBLICATIONS

Written Opinion dated Jul. 15, 2020 in PCT Application No. PCT/CN2020/084892.
Solozabal et al. "Exploitation of Mobile Edge Computing in 5G Distributed Mission-Critical Push-to-Talk Service Deployment", IEEE Access, vol. 6, Jun. 20, 2018, pp. 37665-37675.
Kekki, et al. "MEC in 5G Networks", ETSI White Paper, No. 28, Jun. 30, 2018, 28 pages.

* cited by examiner

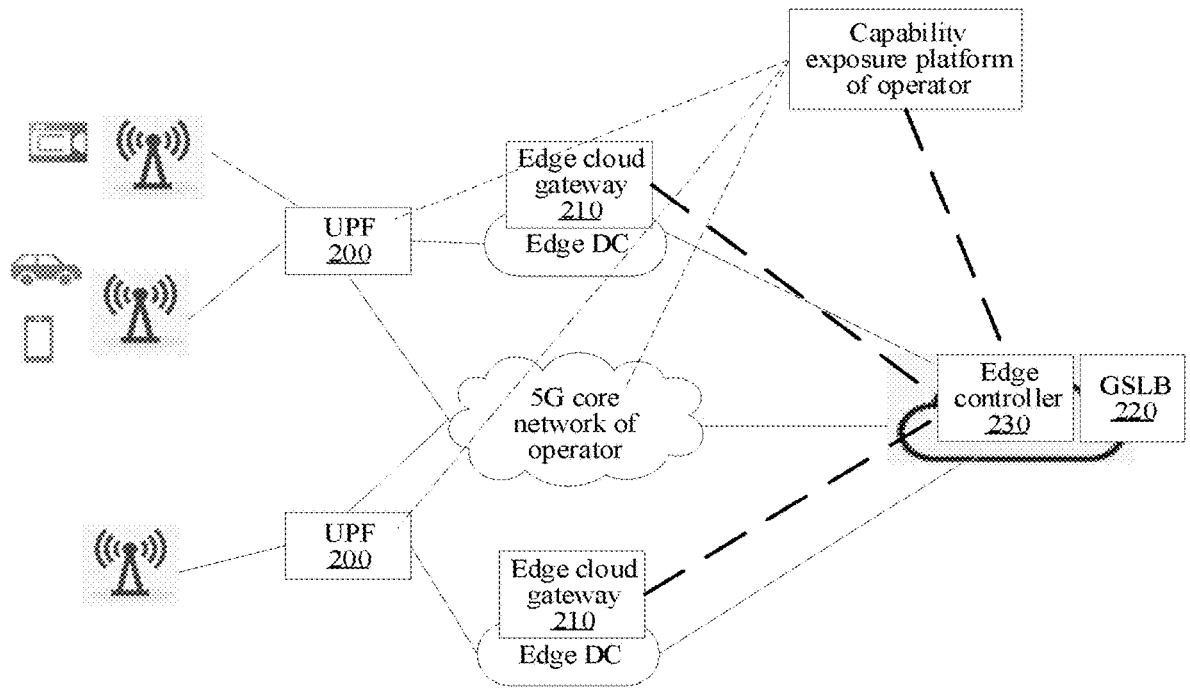

FIG. 2

An edge cloud gateway receives a first HTTP service request forwarded by a UPF, a destination address of the first HTTP service request being an edge-application VIP — 300

Determine a corresponding MEC processing server according to the first HTTP service request and a preset offloading policy, and offload the first HTTP service request to the corresponding MEC processing server — 310

FIG. 3

METHOD, APPARATUS, AND SYSTEM FOR SELECTING MEC NODE

RELATED APPLICATIONS

This application is a continuation of International Application No. PCT/CN2020/084892, filed on Apr. 15, 2020, which claims priority to Chinese Patent Application No. 201910387647.7, entitled "METHOD, APPARATUS, AND SYSTEM FOR SELECTING MEC NODE" and filed on May 10, 2019. The entire disclosures of the prior applications are hereby incorporated by reference in their entirety.

FIELD OF THE TECHNOLOGY

This application relates to the field of mobile communication, including mobile edge computing (MEC) node selection.

BACKGROUND OF THE DISCLOSURE

With the development of science and technology, currently, users have higher requirements for processing and transmission rates of communication services. Particularly, for a fifth-generation mobile communication technology (5G) mobile communication network, requirements for a processing speed are higher. In MEC, computing, storage, and processing capabilities can be provided by using a nearby mobile access network, to reduce latency. Therefore, a mobile terminal needs to be scheduled to a MEC node closest to the mobile terminal.

SUMMARY

According to an exemplary aspect, in a method for selecting a mobile edge computing (MEC) node that performed by an edge cloud gateway, a first HyperText Transfer Protocol (HTTP) service request forwarded by the UPF is received by processing circuitry of the edge cloud gateway. A destination address of the first HTTP service request is an edge-application virtual Internet Protocol address (VIP). A corresponding MEC processing server is determined according to the first HTTP service request and a preset offloading policy, and the first HTTP service request is offloaded to the corresponding MEC processing server. The edge cloud gateway is disposed in a system for selecting a MEC node, such that the system includes at least a user plane function (UPF) and the edge cloud gateway.

According to an exemplary aspect, an edge cloud gateway for selecting a mobile edge computing (MEC) node is disposed in a system for selecting a MEC node. The system includes at least a user plane function (UPF) and the edge cloud gateway. The edge cloud gateway includes processing circuitry configured to receive a first HyperText Transfer Protocol (HTTP) service request forwarded by the UPF, a destination address of the first HTTP service request being an edge-application virtual Internet Protocol address (VIP). The processing circuitry is also configured to determine a corresponding MEC processing server according to the first HTTP service request and a preset offloading policy, and offload the first HTTP service request to the corresponding MEC processing server.

According to an exemplary aspect, a system for selecting a mobile edge computing (MEC) node includes a user plane function (UPF), and an edge cloud gateway. The UPF is configured to receive a first HyperText Transfer Protocol (HTTP) service request transmitted by a terminal, and forward the first HTTP service request to the edge cloud gateway in response to determining that a destination address in the first HTTP service request is an edge-application virtual Internet Protocol address (VIP). The edge cloud gateway is configured to receive the first HTTP service request forwarded by the UPF, determine a corresponding MEC processing server based on the first HTTP service request and a preset offloading policy, and offload the first HTTP service request to the corresponding MEC processing server.

BRIEF DESCRIPTION OF THE DRAWINGS

FIG. 2 is a schematic architectural diagram of a system for selecting a MEC node according to an exemplary embodiment of this disclosure.

FIG. 3 is a flowchart of a method for selecting a MEC node according to an exemplary embodiment of this disclosure.

DESCRIPTION OF EMBODIMENTS

The following describes the technical solutions in exemplary embodiments of this disclosure with reference to the accompanying. As can be appreciated, the described embodiments are merely exemplary, and other embodiments are possible without departing from the scope of the present disclosure.

To facilitate the understanding of the exemplary embodiments of this disclosure, the following concepts are briefly introduced.

Content delivery network (CDN): A basic idea of the CDN is to avoid, as many as possible, bottlenecks and links on the Internet that may affect a speed and stability of data transmission, so that content transmission is faster and more stable, and provide nearby access to the CDN for acceleration.

Domain name system (DNS): As a distributed database that can map a domain name and an Internet Protocol (IP) address to each other, the DNS spares users the trouble of memorizing IP address data strings that can be directly read by a machine, so that it is easier for users to access the Internet.

User plane function (UPF): The UPF is responsible for user plane processing.

Global server load balance (GSLB): The GSLB implements traffic distribution between servers in different regions on a wide area network including the Internet, and directs a user request to the nearest node (or region) to ensure access quality. Mobile edge computing (MEC): The MEC is a technology that deeply integrates the mobile access network with the Internet service based on the 5G evolution architecture. The MEC, by using a wireless access network nearby, provides services and cloud computing functions required by the Internet technology (IT) for telecommunication users, to create a carrier-class service environment with high performance, low latency, and high bandwidth, accelerate rapid download of various content, services, and applications in the network, and allow consumers to experience an uninterrupted high-quality network.

Virtual IP (VIP): The VIP is an IP address that does not link to a specific computer or a network interface controller (NIC) in a computer. Packets are transmitted to this VIP address, but all data still passes through a real network interface.

Edge-application VIP: Located in an edge equipment room, the edge-application VIP indicates a virtual IP address that provides local acceleration for an application.

At present, the gradual development of the 5G mobile communication network leads to higher requirements for processing and transmission rates of communication services. The MEC can provide computing, storage, and processing capabilities, and the like by using a mobile access network nearby to reduce latency. However, how to schedule a mobile terminal to a MEC node closest to the mobile terminal is an urgent problem that needs to be resolved. 5G is a cutting-edge technology, where there are relatively few related researches. There is no relevant solution for how to select a MEC node in a 5G mobile communication network.

Figure 1:
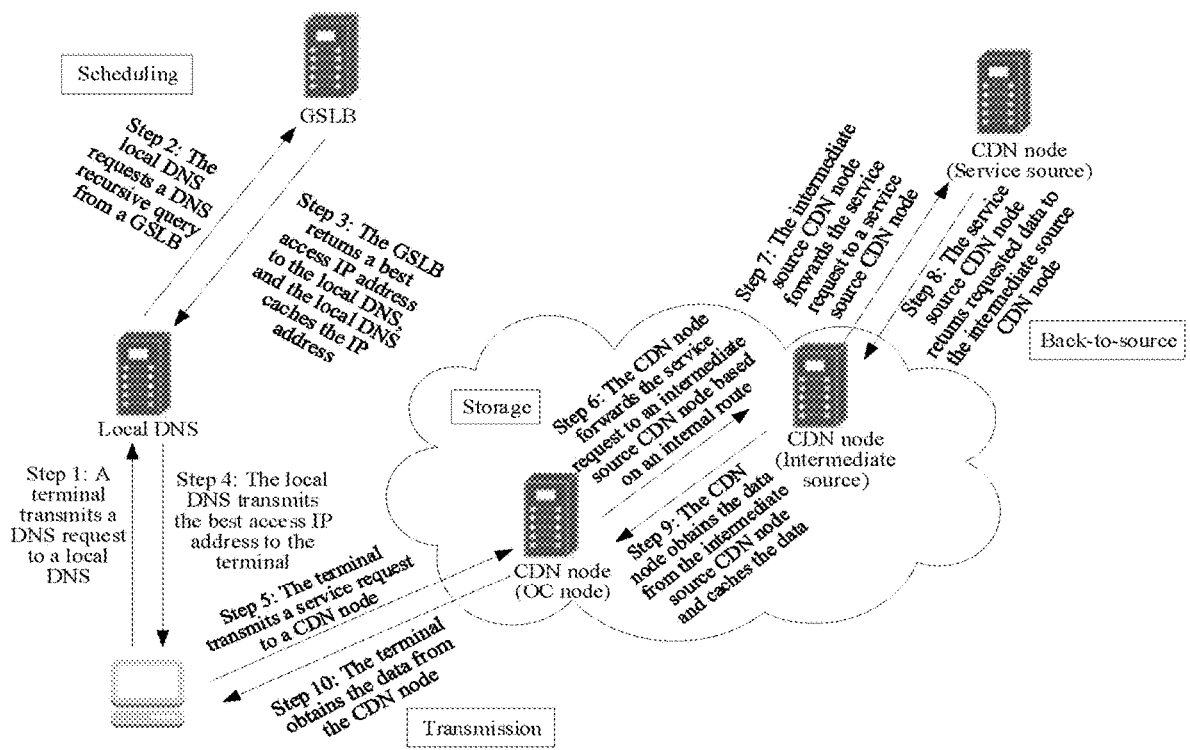
FIG. 1 is a schematic flowchart of a CDN scheduling method.

In addition, the conventional DNS addressing mechanism in the related art is similar to determining a corresponding IP address for data transmission. FIG. 1 is a schematic flowchart of a CDN scheduling method. The method including the following steps.

In step 1, a terminal transmits a DNS request to a local DNS. In step 2, the local DNS requests a DNS recursive query from a GSLB. In step 3, the GSLB returns a best access IP address to the local DNS, and the local DNS caches the IP address. In step 4, the local DNS transmits the best access IP address to the terminal. In step 5, the terminal transmits a service request to a CDN node. The CDN node is an edge node, that is, an outer center (OC). In step 6, the CDN node forwards the service request to an intermediate source CDN node based on an internal route. In step 7, the intermediate source CDN node forwards the service request to a service source CDN node. In step 8, the service source CDN node returns requested data to the intermediate source CDN node. In step 9, the CDN node obtains the data from the intermediate source CDN node and caches the data. In step 10, the terminal obtains the data from the CDN node.

This scheduling method is to position a location of the terminal by using the IP address allocated by an operator, to schedule the terminal to the nearest CDN node. However, the IP positioning technology has large deviations and low precision, and can only reach the provincial level. However, there are many MEC nodes in this region. Consequently, precision requirements of the MEC nodes cannot be met, that is, the terminal cannot be scheduled to the nearest MEC node.

Therefore, in the exemplary embodiments of this disclosure, a method for selecting a MEC node is provided mainly for a 5G mobile communication network, which is mainly based on a conventional DNS addressing mechanism and an HTTP DNS requesting process, transforming an existing network access process without being perceived by an application of a terminal, to achieve access to a nearby edge computing node.

FIG. 2 is an architectural diagram of a system for selecting a MEC node according to an exemplary embodiment of this disclosure. At least a UPF 200, an edge cloud gateway 210, and a GSLB 220 are included, and an edge controller 230 is further included.

In an exemplary embodiment of this disclosure, in a network architecture layout, a data channel can connect a central cloud and an edge cloud of a core network of an operator, and to offload data to an edge computing node, the edge cloud gateway 210 and the edge controller 230 are added. The edge cloud gateway 210 is configured on a MEC node side or an edge data center (DC) side, and the edge controller 230 is configured on a central cloud of the core network and communicably connected to the edge cloud gateway 210 and the UPF 200 respectively. The GSLB 220 is also deployed on the central cloud side of the core network, and is a device in juxtaposition to the edge controller 230. In addition, the UPF 200, the edge cloud gateway 210, and the GSLB 220 respectively correspond to different pre-configuration rules. The pre-configuration rule represents a routing configuration for service acceleration.

The edge controller 230 is mainly responsible for scheduling of global service traffic, and controls the scheduling of service traffic to the edge cloud gateway 210. Then, the edge cloud gateway 210 schedules the service traffic to a specific local MEC processing server, including the following steps.

In step a, the edge controller 230 connects to a capability exposure platform of an operator, and pre-configures the UPF 200 and the edge cloud gateway 210 when an edge service is deployed.

Specifically, the edge controller 230 is configured to respectively configure a first pre-configuration rule and a fourth pre-configuration rule of the UPF 200, and a second pre-configuration rule of the edge cloud gateway 210. The foregoing configuration rules are described in detail in the following embodiments.

For example, as shown in FIG. 2, the edge controller 230 may pre-configure the UPF 200 by using the capability exposure platform of the operator and a 5G core network of the operator.

In step b, the edge controller 230 dynamically collects user location information from a 5G core network side of the operator, and select nearby edge computing nodes for hosting services. The hosting services represents services that require edge computing in the 5G mobile communication network, that is, services that require service acceleration.

In step c, the edge controller 230 connects to a cloud infrastructure-as-a-service (IaaS) or platform-as-a-service (PaaS) controller to control edge DC resources.

The IaaS and PaaS are not shown in FIG. 2. In practice, the IaaS and PaaS may be located between the edge cloud gateway 210 and the edge controller 230. Mainly, the edge controller 230 can monitor a load status of the edge cloud gateway 210 through the IaaS and PaaS, and control load scheduling of the edge cloud gateway 210.

For the GSLB 220, when an edge service is deployed, the GSLB 220 also needs to be pre-configured. Specifically, the GSLB 220 corresponds to a third pre-configuration rule or a fifth pre-configuration rule.

The third pre-configuration rule includes at least returning, for a DNS request of which a domain name is a preset service acceleration domain name, the global edge gateway IP address. Specifically, the GSLB 220 is configured to return the global edge gateway IP address to the terminal when the DNS request transmitted by the terminal is received and if it is determined that the domain name in the DNS request is the preset service acceleration domain name.

The global edge gateway IP address is an IP address that identifies service acceleration, and may be one IP address or a group of IP addresses having an identifying property.

For an HTTP DNS request of which a domain name is a preset service acceleration domain name, a corresponding edge-application VIP is returned based on a source address and the service acceleration domain name in the HTTP DNS request, the source address being the IP address of the edge cloud gateway 210.

For example, when receiving the first HTTP DNS request transmitted by the edge cloud gateway 210, the GSLB 220 returns the first HTTP DNS response to the edge cloud gateway 210. The first HTTP DNS request includes at least a service acceleration domain name and a source address, the source address being an IP address of the edge cloud gateway 210. The first HTTP DNS response includes the edge-application VIP, the edge-application VIP being determined by the GSLB 220 according to the IP address of the edge cloud gateway 210 and the service acceleration domain name in the first HTTP DNS request.

For the GSLB 220, alternatively, manually add an intervention method to return configured IP addresses for different source addresses in the first HTTP DNS request.

The fifth pre-configuration rule includes at least returning, for an HTTP DNS request of which a domain name is a preset service acceleration domain name, a corresponding edge-application VIP based on the service acceleration domain name in the HTTP DNS request.

For example, when receiving the second HTTP DNS request forwarded by the UPF 200, the GSLB 220 returns a second HTTP DNS response, the second HTTP DNS request being forwarded when the UPF 200 obtains through resolution that a destination address in the second HTTP DNS request transmitted by the terminal is an IP address of the GSLB 220. The second HTTP DNS response includes at least an edge-application VIP, the edge-application VIP being determined by the GSLB 220 according to a service acceleration domain name in the second HTTP DNS request.

That is, the fifth pre-configuration rule of the GSLB 220 is for a case in which when the terminal initiates an HTTP DNS request (such as the second HTTP DNS request) for an original domain name, the UPF 200 directly forwards the HTTP DNS request of the terminal to the GSLB 220. In this case, the GSLB 220 obtains the service acceleration domain name according to the HTTP DNS request forwarded by the UPF 200, and determines the corresponding edge-application VIP.

For the GSLB 220, alternatively, manually add an intervention method to return configured IP addresses for different service acceleration domain names in the second HTTP DNS request.

For the UPF 200, in this embodiment of this application, the UPF 200 needs to be pre-configured. A pre-configuration function represents a routing configuration for service acceleration. The UPF 200 needs to provide a routing configuration function. The UPF 200 corresponds to the first pre-configuration rule or the fourth pre-configuration rule.

The first pre-configuration rule includes at least forwarding an HTTP service request of which a destination address is the global edge gateway IP address to the edge cloud gateway 210.

For example, the UPF 200 receives a second HTTP service request transmitted by the terminal, and forwards the second HTTP service request to the edge cloud gateway 210 in response to determining that a destination address in the second HTTP service request is the global edge gateway IP address. The pre-configuration rules also include forwarding an HTTP service request of which a destination address is the edge-application VIP to the edge cloud gateway 210.

For example, the UPF 200 receives the first HTTP service request retransmitted by the terminal, and forwards the first HTTP service request to the edge cloud gateway 210 in response to determining that the destination address in the first HTTP service request is the edge-application VIP.

In an exemplary embodiment of this disclosure, the first pre-configuration rule of the UPF 200 is for a standard DNS requesting process, and in this case, the terminal initiates a DNS request for the original domain name.

The fourth pre-configuration rule includes at least forwarding an HTTP service request of which a destination address is the edge-application VIP to the edge cloud gateway 210.

For example, the UPF 200 receives the first HTTP service request transmitted by the terminal, and forwards the first HTTP service request to the edge cloud gateway 210 in response to determining that the destination address of the first HTTP service request is the edge-application VIP.

The fourth pre-configuration rule of the UPF 200 is for a HTTP DNS requesting process. In this case, the terminal initiates a second HTTP DNS request for the original domain name. In addition, when the terminal initiates the second HTTP DNS request, the destination address in the second HTTP DNS request is the IP address of the GSLB 220. When the UPF 200 obtains through resolution that a destination address in the second HTTP DNS request transmitted by the terminal is an IP address of the GSLB, the second HTTP DNS request can be forwarded to the GSLB 220. This rule can be implemented based on an existing forwarding mechanism, and no further configuration is required. Then the UPF 200 receives a second HTTP DNS response returned by the GSLB 220, and forwards the second HTTP DNS response to the terminal, so that the terminal is caused to transmit the first HTTP service request based on the edge-application VIP in the second HTTP DNS response. The second HTTP DNS response includes at least the edge-application VIP, the edge-application VIP being determined by the GSLB 220 based on the fifth pre-configuration rule, that is, based on a service acceleration domain name in the second HTTP DNS request.

In an exemplary embodiment of this disclosure, the first pre-configuration rule or the fourth pre-configuration rule is configured by the configured edge controller 230, or is configured locally. That is, the UPF 200 not only can be configured and managed by the edge controller 230 in a unified manner, but also can be configured and loaded locally, which is not limited in this embodiment of this disclosure.

Different pre-configuration rule rules correspond to different implementations and cases. The GSLB 220 corresponds to the pre-configuration rules of the UPF 200. If for a standard DNS requesting process, the terminal transmits a DNS request to the GSLB 220, and in this case, the GSLB 220 performs corresponding actions based on the third pre-configuration rule, that is, returns the global edge gateway IP address to the terminal, then the UPF 200 performs corresponding actions based on the first pre-configuration rule. That is, the second HTTP service request transmitted by the terminal may be forwarded to the edge cloud gateway 210, and then the edge cloud gateway 210 obtains the edge-application VIP from the GSLB 220 and transmits the edge-application VIP to the terminal. The terminal re-initiates the first HTTP service request, then the UPF 200 forwards the first HTTP service request to the edge cloud gateway 210 based on the first pre-configuration rule, and the edge cloud gateway 210 schedules the first HTTP service request to the corresponding MEC processing server.

For a HTTP DNS requesting process, the UPF 200 corresponds to the fourth pre-configuration rule, and the GSLB 220 corresponds to the fifth pre-configuration rule. The terminal initiates a second HTTP DNS request to the GSLB 220 by using the UPF 200, then the GSLB 220 returns the edge-application VIP to the terminal based on the corresponding fifth pre-configuration rule, and further, the terminal initiates the first HTTP service request. The UPF 200 performs corresponding actions based on the fourth pre-configuration rule, that it, forwards the first HTTP service request to the edge cloud gateway 210, and the edge cloud gateway 210 schedules the first HTTP service request to the corresponding MEC processing server. The two implementations are not limited in the embodiments of this application.

The edge cloud gateway 210 is mainly configured for intelligent scheduling, load balancing, statistical analysis, and the like of local traffic, that is, traffic within a geographical range for which the edge cloud gateway 210 is responsible, to schedule service traffic to a specific MEC processing server. In an exemplary embodiment of this disclosure, when an edge service is deployed, the edge cloud gateway 210 also needs to be pre-configured. Specifically, the edge cloud gateway 210 corresponds to the second pre-configuration rule, and the second pre-configuration rule includes at least a preset offloading policy.

For example, the preset offloading policy is to perform offloading based on IP 5-tuple information. For example, usually, an IP 5-tuple includes a source IP address, a destination IP address, a protocol number, a source port, and a destination port, and the offloading can be performed based on a load balancing algorithm. For example, the load balancing algorithm is source address hashing. The source IP address is hashed, and a hash value is obtained through the hash calculation. Based on the hash value and configuration rules of a MEC processing server list, a corresponding MEC processing server is determined, and further, the service request is forwarded to the corresponding MEC processing server for processing.

In another example, the preset offloading policy is to perform offloading based on uniform resource locator (URL) information. For example, the service request may further be forwarded to a MEC processing server that processes a corresponding service type according to a service type of the domain name request in the service request, and a specific domain name or resource type stored on each MEC processing server, for example, a specific domain name or resource type representing a service type of processing an image or video.

The specific offloading policy is not limited in this exemplary embodiment of this disclosure, and may be selected and used according to actual requirements.

The second pre-configuration rule is configured by the configured edge controller 230, or is configured locally. That is, the edge cloud gateway 210 not only can be configured and managed by the edge controller 230 in a unified manner, but also can be configured and loaded locally, which is not limited in this exemplary embodiment of this disclosure. Specifically, the edge cloud gateway 210 is configured to perform the following steps.

In step S1, a first HTTP service request forwarded by the UPF 200 is received. The first HTTP service request is forwarded in a case that the UPF 200 obtains through resolution that a destination address in the first HTTP service request transmitted by the terminal is an edge-application VIP.

In step S2, a corresponding MEC processing server is determined according to the first HTTP service request and a preset offloading policy, and the first HTTP service request is offloaded to the corresponding MEC processing server.

Further, for the standard DNS requesting process and the HTTP DNS requesting process, before the edge cloud gateway 210 performs step S1 is performed, there are the following two implementations.

In a first implementation, for a standard DNS requesting process, that is, a case in which the terminal initiates a DNS request for an original domain name, the edge cloud gateway 210 is further configured to perform the following steps.

In a first step, a second HTTP service request forwarded by the UPF 200 is received, where the second HTTP service request is forwarded when the UPF 200 obtains through resolution that a destination address in the second HTTP service request transmitted by the terminal is the global edge gateway IP address, the global edge gateway IP address is returned to the terminal in a case that the GSLB 220 receives a DNS request transmitted by the terminal, and the global edge gateway IP address is an IP address that identifies service acceleration. In a second step, the edge-application VIP is obtained from the GSLB 220 based on the second HTTP service request. Specifically, the following steps are performed.

In step a, a first HTTP DNS request is transmitted to the GSLB 220. The first HTTP DNS request includes at least a service acceleration domain name and a source address, and the source address is an IP address of the edge cloud gateway 210.

In step b, a first HTTP DNS response returned by the GSLB 220 is received. The first HTTP DNS response includes the edge-application VIP, and the edge-application VIP is determined by the GSLB 220 according to the IP address of the edge cloud gateway 210 and the service acceleration domain name in the first HTTP DNS request.

A redirection response is also transmitted to the terminal, where a redirection address in the redirection response is the edge-application VIP, so that the terminal is caused to transmit the first HTTP service request based on the redirection response, that is, the first HTTP service request in S1. The redirection response is an HTTP 302 redirection response, and is used for causing the terminal to transmit the first HTTP service request.

In a second implementation, an HTTP DNS requesting process, that is, the terminal initiates an HTTP DNS request for an original domain name, the first HTTP service request is transmitted when the terminal receives a second HTTP DNS response forwarded by the UPF 200. The second HTTP DNS response is returned when the GSLB 220 receives a second HTTP DNS request forwarded by the UPF 200. The second HTTP DNS request is forwarded when the UPF 200 obtains through resolution that a destination address in the second HTTP DNS request transmitted by the terminal is an IP address of the GSLB 220. The second HTTP DNS response includes at least an edge-application VIP, the edge-application VIP being determined by the GSLB 220 according to a service acceleration domain name in the second HTTP DNS request.

In this way, in an exemplary embodiment of this disclosure, for the conventional DNS addressing process or HTTP DNS requesting process, an edge cloud gateway and an edge controller are added, so that a terminal can initiate a DNS request or an HTTP DNS request for an original domain name by using a standard DNS request or an HTTP DNS request. For a DNS request of the terminal, a global edge gateway IP address that identifies service acceleration is returned for a domain name that requires service acceleration, and further, processing can be performed by using the edge cloud gateway, to obtain an edge-application VIP from the GSLB. The terminal is caused to retransmit a service request based on the edge-application VIP, and the service request of the terminal is offloaded to a specific MEC processing server. Alternatively, for an HTTP DNS request of the terminal, the terminal obtains the edge-application VIP from the GSLB by using the UPF, and further may initiate a first HTTP service request based on the edge-application VIP, and forward the first HTTP service request to the edge cloud gateway, and the edge cloud gateway processes the first HTTP service request, and offloads the first HTTP service request to a specific MEC processing server. Because the edge cloud gateway is closer to the terminal and the edge cloud gateway can convert the original DNS request into an HTTP DNS request to bypass a local DNS so as to simplify the access procedure, this application provides a higher processing rate and reduced latency, and can be applied to selecting a nearby edge computing node, thereby achieving edge acceleration. In addition, in the framework of the related art, various over-the-top (OTT) services can be provided for users through the Internet, and a MEC node can be smoothly accessed without transformation, which is not perceived by the users, thereby improving the ease of implementation and user experience.

Based on the architectural diagram of the system shown in FIG. 2 in the foregoing exemplary embodiment, FIG. 3 is a flowchart of a method for selecting a MEC node according to an exemplary embodiment of this disclosure. The method is mainly applied to an edge cloud gateway, the method including the following steps.

In step 300, an edge cloud gateway receives a first HTTP service request forwarded by a UPF, where a destination address of the first HTTP service request is an edge-application VIP.

In step 310, a corresponding MEC processing server is determined according to the first HTTP service request and a preset offloading policy, and the first HTTP service request is offloaded to the corresponding MEC processing server.

Before step 300 is performed, the edge-application VIP may be obtained in different manners according to different request statuses of the terminal, and procedures for triggering step 300 are different. Specifically, the following two manners may be adopted.

In a first manner, for a standard DNS requesting process, before the edge cloud gateway receives the first HTTP service request forwarded by the UPF, the following steps are further included.

In a first step, a second HTTP service request forwarded by the UPF is received. A destination address of the second HTTP service request is a global edge gateway IP address. The global edge gateway IP address is returned to the terminal in a case that the GSLB receives a DNS request transmitted by the terminal, and the global edge gateway IP address is an IP address that identifies service acceleration.

In a second step, the edge-application VIP from the GSLB is obtained based on the second HTTP service request. Specifically, the following two steps are included.

In a first step, a first HTTP DNS request is transmitted to the GSLB. The first HTTP DNS request includes at least a service acceleration domain name and a source address, and the source address is an IP address of the edge cloud gateway.

In a second step, a first HTTP DNS response returned by the GSLB is received. The first HTTP DNS response includes the edge-application VIP. The edge-application VIP is determined by the GSLB according to the IP address of the edge cloud gateway and the service acceleration domain name in the first HTTP DNS request.

In a third step, a redirection response is transmitted to the terminal, where a redirection address in the redirection response is the edge-application VIP, so that the terminal is caused to transmit the first HTTP service request based on the redirection response.

For the first manner, during specific execution, the UPF performs corresponding actions according to the first pre-configuration rule thereof, the GSLB performs corresponding actions according to the third pre-configuration rule thereof, and the edge cloud gateway performs corresponding actions according to the second pre-configuration rule thereof, so that the edge cloud gateway converts the DNS request of the terminal into the first HTTP DNS request so as to simplify the access process and reduce latency. In addition, the first HTTP service request of the terminal is forwarded to the edge cloud gateway, so that a nearby edge computing node is selected, thereby achieving service acceleration.

In a second manner, for an HTTP DNS requesting process, before the edge cloud gateway receives the first HTTP service request forwarded by the UPF, the following is included. The first HTTP service request is transmitted when the terminal receives the second HTTP DNS response forwarded by the UPF. The second HTTP DNS response is returned when the GSLB receives the second HTTP DNS request forwarded by the UPF, and the second HTTP DNS request is forwarded when the UPF obtains through resolution that a destination address in the second HTTP DNS request transmitted by the terminal is an IP address of the GSLB. The second HTTP DNS response includes at least an edge-application VIP. The edge-application VIP is determined by the GSLB according to a service acceleration domain name in the second HTTP DNS request.

For the second manner, during specific execution, the UPF performs corresponding actions according to the fourth pre-configuration rule, the GSLB performs corresponding actions according to the fifth pre-configuration rule, and the edge cloud gateway performs corresponding actions according to the second pre-configuration rule, so that the terminal is caused to transmit the HTTP DNS request to the GSLB, obtains the edge-application VIP, transmits the first HTTP service request based on the edge-application VIP, and forwards the first HTTP service request to the edge cloud gateway. The edge cloud gateway processes the first HTTP service request and forwards the first HTTP service request to the corresponding MEC processing server, so that a nearby edge computing node is selected, thereby achieving service acceleration.

Based on the foregoing exemplary embodiments, specific application scenarios are used below for description. For different request status of different terminals, two different implementations may be adopted to illustrate the method for selecting a MEC node in this exemplary embodiment of this disclosure.

In a first implementation, for a standard DNS requesting process, that is, the terminal initiates a DNS request for an original domain name, the UPF corresponds to the first pre-configuration rule, the GSLB corresponds to the third pre-configuration rule, and the edge cloud gateway corresponds to the second pre-configuration rule.

Figure 4:
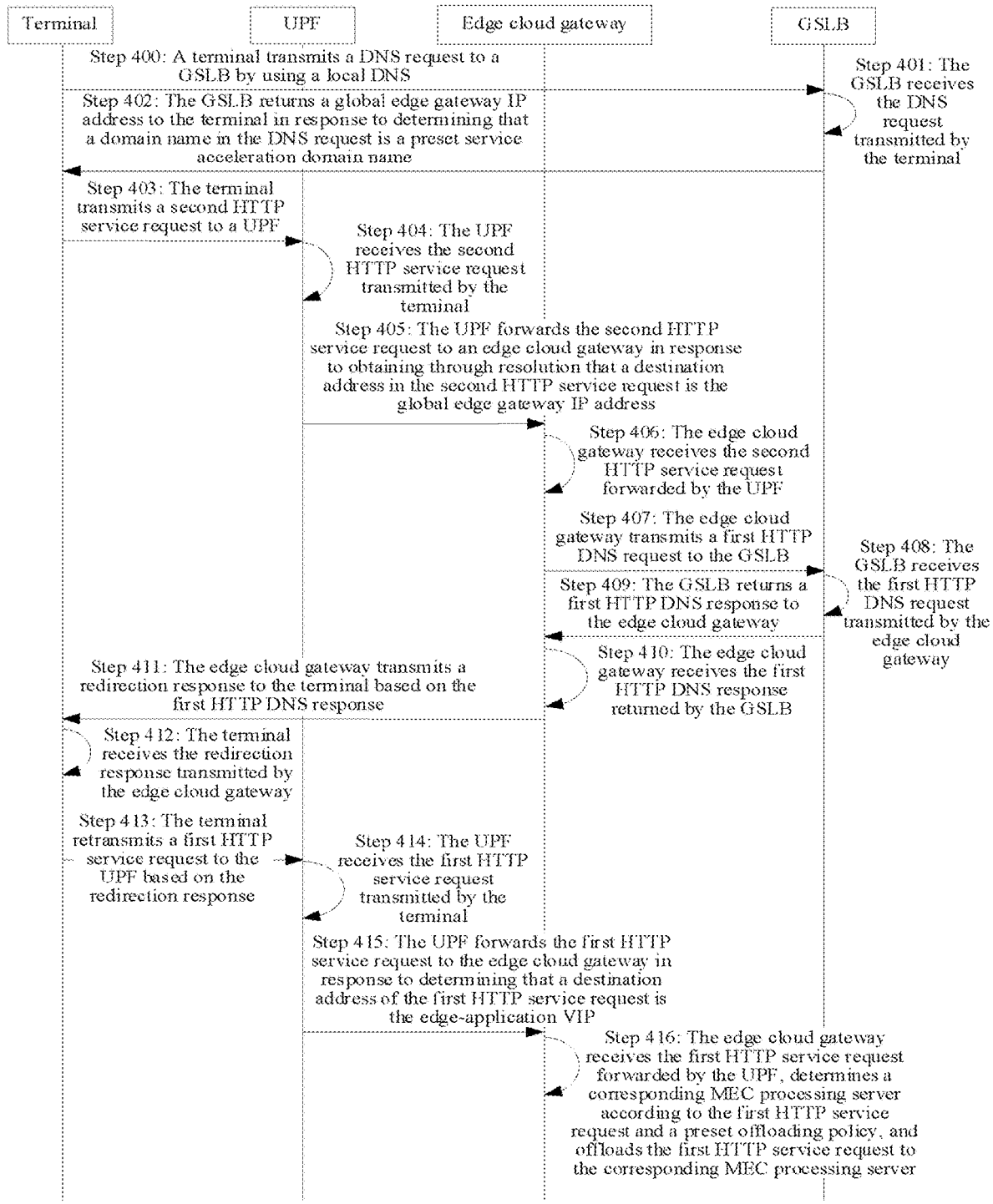
FIG. 4 is an interactive flowchart of a method for selecting a MEC node according to an exemplary embodiment of this disclosure.

FIG. 4 is an interactive flowchart of a method for selecting a MEC node according to an exemplary embodiment of this disclosure.

In step 400, a terminal transmits a DNS request to a GSLB by using a local DNS.

Specifically, the terminal may initiate a request for an original domain name by using a standard DNS request. Based on a conventional DNS addressing mechanism, the request is forwarded to the GSLB by using the local DNS.

In step 401, the GSLB receives the DNS request transmitted by the terminal.

In step 402, the GSLB returns a global edge gateway IP address to the terminal in response to determining that a domain name in the DNS request is a preset service acceleration domain name.

In an exemplary embodiment of this disclosure, that the GSLB can implement this function mainly depends on the pre-configuration on the GSLB. The GSLB returns the global edge gateway IP address as a destination IP according to the corresponding third pre-configuration rule.

In step 403, the terminal transmits a second HTTP service request to a UPF.

After receiving the global edge gateway IP address, the terminal initiates a second HTTP service request, where a destination address in the second HTTP service request is the global edge gateway IP address.

In step 404, the UPF receives the second HTTP service request transmitted by the terminal.

In step 405, the UPF forwards the second HTTP service request to an edge cloud gateway in response to obtaining through resolution that a destination address in the second HTTP service request is the global edge gateway IP address.

This step is also implemented by the UPF based on a first pre-configuration rule corresponding thereto, where the first pre-configuration rule is forwarding an HTTP service request of which a destination address is the global edge gateway IP address to the edge cloud gateway.

In step 406, the edge cloud gateway receives the second HTTP service request forwarded by the UPF.

In step 407, the edge cloud gateway transmits a first HTTP DNS request to the GSLB.

The first HTTP DNS request includes at least a service acceleration domain name and a source address, the source address being an IP address of the edge cloud gateway. That is, the edge cloud gateway initiates a first HTTP DNS request to the GSLB by using the IP address thereof as the source address. In this way, the edge cloud gateway can convert the original DNS request into an HTTP DNS request, and when transmitting the HTTP DNS request another time, can transmit the HTTP DNS request directly to the GSLB by bypassing the local DNS, which simplifies the access procedure.

In step 408, the GSLB receives the first HTTP DNS request transmitted by the edge cloud gateway.

In step 409, the GSLB returns a first HTTP DNS response to the edge cloud gateway.

The first HTTP DNS response includes an edge-application VIP, the edge-application VIP being determined by the GSLB according to the IP address of the edge cloud gateway and the service acceleration domain name.

In an exemplary embodiment of this disclosure, if the GSLB determines that the source address in the first HTTP DNS request is the IP address of the edge cloud gateway, and the requested domain name is the service acceleration domain name, an actual edge-application VIP can be selected to return according to the IP address of the edge cloud gateway and a service configuration corresponding to the service acceleration domain name.

In step 410, the edge cloud gateway receives the first HTTP DNS response returned by the GSLB.

In step 411, the edge cloud gateway transmits a redirection response to the terminal based on the first HTTP DNS response.

A redirection address in the redirection response is the edge-application VIP.

The redirection response is an HTTP 302 redirection response, which instructs the terminal to re-initiate the service request.

In step 412, the terminal receives the redirection response transmitted by the edge cloud gateway.

In step 413, the terminal retransmits a first HTTP service request to the UPF based on the redirection response.

Specifically, after receiving the redirection response, the terminal can re-initiate the service request according to standard HTTP actions, where a destination address in the first HTTP service request is the edge-application VIP.

In step 414, the UPF receives the first HTTP service request transmitted by the terminal.

In 415, the UPF forwards the first HTTP service request to the edge cloud gateway in response to determining that a destination address of the first HTTP service request is the edge-application VIP.

This step is implemented by the UPF based on the corresponding first pre-configuration rule, where the first pre-configuration rule is forwarding an HTTP service request of which a destination address is the edge-application VIP to the edge cloud gateway.

In step 416, the edge cloud gateway receives the first HTTP service request forwarded by the UPF, determines a corresponding MEC processing server according to the first HTTP service request and a preset offloading policy, and offloads the first HTTP service request to the corresponding MEC processing server.

In this way, in an exemplary embodiment of this disclosure, a service data procedure for selecting a MEC node based on a standard DNS requesting process is provided mainly for a 5G mobile communication network. Devices, such as the edge cloud gateway, may offload a service to the nearest MEC processing server with higher accuracy so as to select a MEC node and reduce latency, thereby achieving service acceleration.

In a second implementation, for an HTTP DNS requesting process, that is, when the terminal initiates an HTTP DNS request for an original domain name, the UPF corresponds to the fourth pre-configuration rule, the GSLB corresponds to the fifth pre-configuration rule, and the edge cloud gateway corresponds to the second pre-configuration rule.

Figure 5:
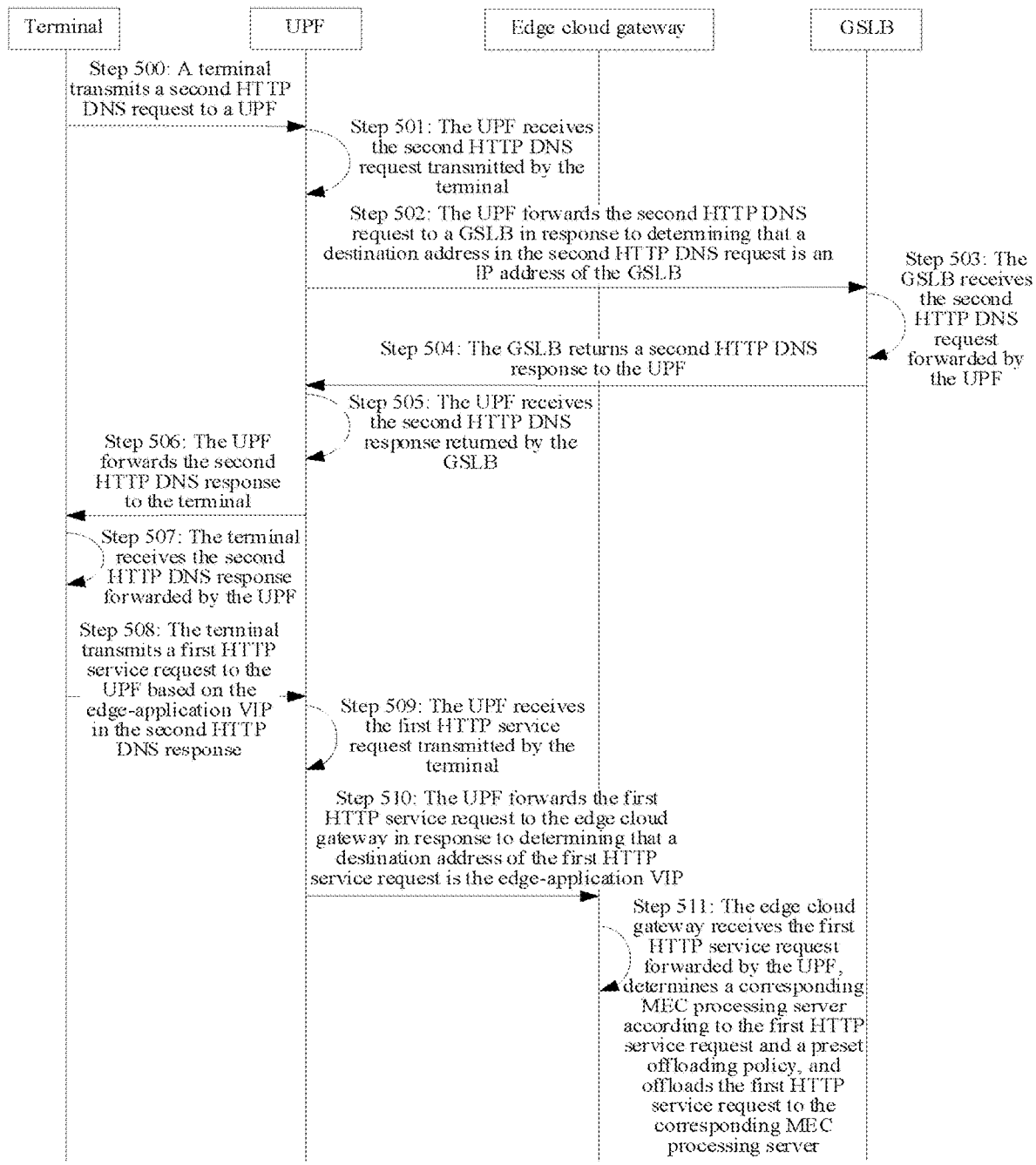
FIG. 5 is an interactive flowchart of another method for selecting a MEC node according to an exemplary embodiment of this disclosure.

FIG. 5 is a flowchart of a method for selecting a MEC node according to an exemplary embodiment of this disclosure.

In step 500, a terminal transmits a second HTTP DNS request to a UPF.

Specifically, the terminal can initiate a request for an original domain name by using an HTTP DNS, that is, based on an HTTP DNS addressing mechanism. A destination address in the second HTTP DNS request is an IP address of a GSLB.

In step 501, the UPF receives the second HTTP DNS request transmitted by the terminal.

In step 502, the UPF forwards the second HTTP DNS request to a GSLB in response to determining that a destination address in the second HTTP DNS request is an IP address of the GSLB.

In step 503, the GSLB receives the second HTTP DNS request forwarded by the UPF, and in step 504, the GSLB returns a second HTTP DNS response to the UPF. The second HTTP DNS response includes at least an edge-application VIP.

In step 505, the UPF receives the second HTTP DNS response returned by the GSLB. In step 506, the UPF forwards the second HTTP DNS response to the terminal.

In step 507, the terminal receives the second HTTP DNS response forwarded by the UPF. In step 508, the terminal transmits a first HTTP service request to the UPF based on the edge-application VIP in the second HTTP DNS response. A destination address of the first HTTP service request is the edge-application VIP.

In step 509, the UPF receives the first HTTP service request transmitted by the terminal. In step 510, the UPF forwards the first HTTP service request to the edge cloud gateway in response to determining that a destination address of the first HTTP service request is the edge-application VIP.

In step 511, the edge cloud gateway receives the first HTTP service request forwarded by the UPF, determines a corresponding MEC processing server according to the first HTTP service request and a preset offloading policy, and offloads the first HTTP service request to the corresponding MEC processing server.

In this way, in an exemplary embodiment of this disclosure, another service data procedure for selecting a MEC node based on an HTTP DNS requesting process is provided mainly for a 5G mobile communication network. Devices, such as the edge cloud gateway, may offload a service to the nearest MEC processing server with higher accuracy so as to select a MEC node and reduce latency, thereby achieving service acceleration.

Figure 6:
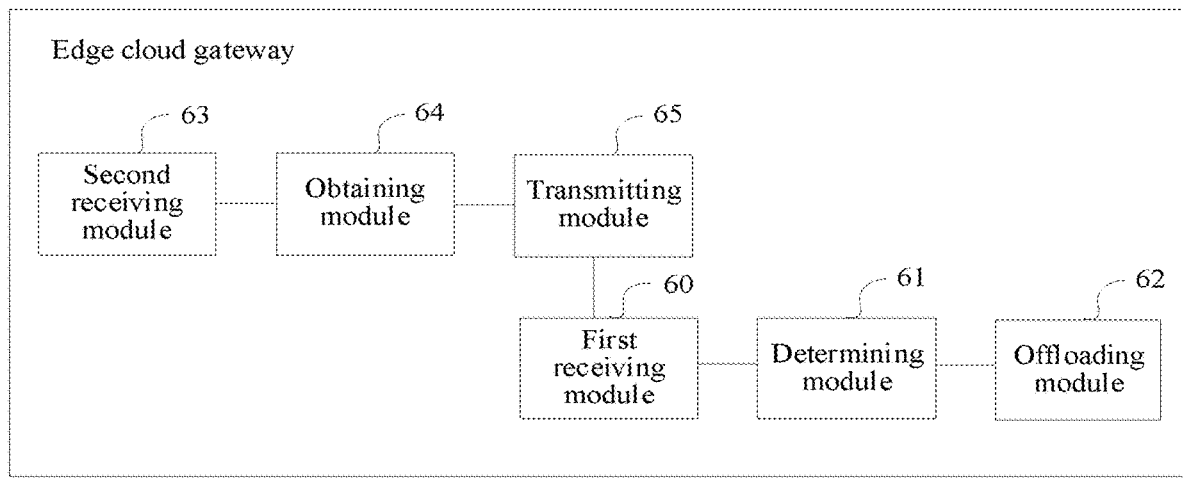
FIG. 6 is a schematic structural diagram of an apparatus for selecting a MEC node according to an exemplary embodiment of this disclosure.

Based on the foregoing exemplary embodiments, FIG. 6 shows an edge cloud gateway for selecting a MEC node according to an exemplary embodiment of this disclosure. The edge cloud gateway is configured on a MEC node side or an edge DC side in a system for selecting a MEC node. The system includes at least a UPF and the edge cloud gateway, and the edge cloud gateway includes the following modules, which are each implemented by processing circuitry to perform the corresponding functions. A first receiving module 60 is configured to receive a first HTTP service request forwarded by the UPF, where a destination address of the first HTTP service request is an edge-application VIP. A determining module 61 is configured to determine a corresponding MEC processing server according to the first HTTP service request and a preset offloading policy. An offloading module 62 is configured to offload the first HTTP service request to the corresponding MEC processing server.

Optionally, the system further includes a GSLB, and the edge cloud gateway further includes a second receiving module 63 that is configured to receive a second HTTP service request forwarded by the UPF. A destination address of the second HTTP service request is a global edge gateway IP address. The global edge gateway IP address is returned to a terminal in a case that the GSLB receives a DNS request transmitted by the terminal, and the global edge gateway IP address is an IP address that identifies service acceleration. An obtaining module 64 is configured to obtain the edge-application VIP from the GSLB based on the second HTTP service request. A transmission module 65 is configured to transmit a redirection response to the terminal. A redirection address in the redirection response is in the edge-application VIP, so that the terminal is caused to transmit the first HTTP service request based on the redirection response.

Optionally, the obtaining module 64 may be configured to transmit a first HTTP DNS request to the GSLB. The first HTTP DNS request includes at least a service acceleration domain name and a source address, and the source address is an IP address of the edge cloud gateway. The obtaining module 64 may also be configured to receive a first HTTP DNS response returned by the GSLB. The first HTTP DNS response includes the edge-application VIP, and the edge-application VIP is determined by the GSLB according to the IP address of the edge cloud gateway and the service acceleration domain name in the first HTTP DNS request.

Optionally, the redirection response is an HTTP 302 redirection response.

Optionally, the first HTTP service request is transmitted in a case that the terminal receives a second HTTP DNS response forwarded by the UPF, the second HTTP DNS response being returned in a case that the GSLB receives a second HTTP DNS request forwarded by the UPF, the second HTTP DNS request being forwarded in a case that the UPF obtains through resolution that a destination address in the second HTTP DNS request transmitted by the terminal is an IP address of the GSLB.

The second HTTP DNS response includes at least the edge-application VIP, the edge-application VIP being determined by the GSLB according to a service acceleration domain name in the second HTTP DNS request.

Optionally, the UPF, the edge cloud gateway, and the GSLB respectively correspond to different pre-configuration rules, the pre-configuration rule representing a routing configuration for service acceleration.

Optionally, the UPF corresponds to a first pre-configuration rule, the first pre-configuration rule including at least forwarding an HTTP service request of which a destination address is the global edge gateway IP address to the edge cloud gateway, or forwarding an HTTP service request of which a destination address is the edge-application VIP to the edge cloud gateway.

The edge cloud gateway corresponds to a second pre-configuration rule, the second pre-configuration rule including at least the preset offloading policy.

The GSLB corresponds to a third pre-configuration rule, the third pre-configuration rule including at least, for a DNS request of which a domain name is a preset service acceleration domain name, returning the global edge gateway IP address, or for an HTTP DNS request of which a domain name is a preset service acceleration domain name, returning a corresponding edge-application VIP based on a source address and the service acceleration domain name in the HTTP DNS request. The source address is the IP address of the edge cloud gateway.

Optionally, the UPF corresponds to a fourth pre-configuration rule, the fourth pre-configuration rule including at least forwarding an HTTP service request of which a destination address is the edge-application VIP to the edge cloud gateway.

The GSLB corresponds to a fifth pre-configuration rule, the fifth pre-configuration rule including at least, for an HTTP DNS request of which a domain name is a preset service acceleration domain name, returning a corresponding edge-application VIP based on the service acceleration domain name in the HTTP DNS request.

Optionally, the first pre-configuration rule, the second pre-configuration rule, or the fourth pre-configuration rule is configured by a configured edge controller or is locally configured.

The edge controller is configured in a cloud center of a core network in the system, and being communicably connected to the edge cloud gateway and the UPF respectively.

Figure 7:
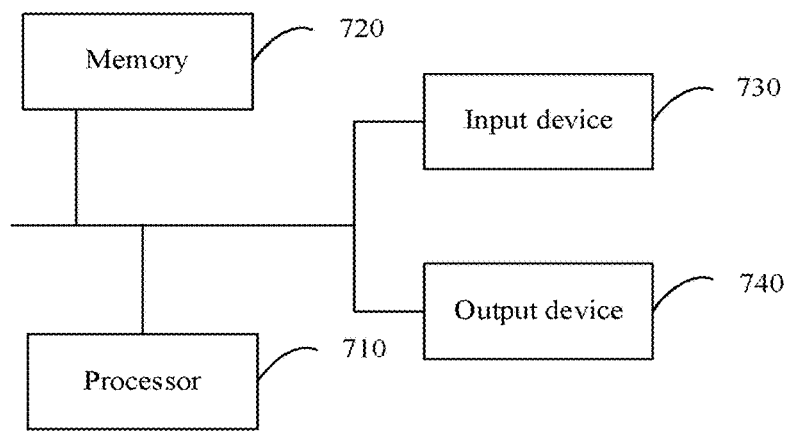
FIG. 7 is a schematic structural diagram of an electronic device according to an exemplary embodiment of this disclosure.

Based on the foregoing exemplary embodiments, FIG. 7 is a schematic structural diagram of an electronic device according to an exemplary embodiment of this disclosure.

This exemplary embodiment of this disclosure provides an electronic device. The electronic device may include circuitry, such as a central processing unit (CPU) 710, a memory 720, an input device 730, an output device 740, and the like. The input device 730 may include a keyboard, a mouse, a touch screen, and the like. The output device 740 may include a display device, such as a liquid crystal display (LCD) or a cathode ray tube (CRT).

The memory 720 may include a read-only memory (ROM) and a random access memory (RAM), and provide program instructions and data stored in the memory 720 for the processor 710. In an exemplary embodiment of this disclosure, the memory 720 may be configured to store a program of the method for selecting a MEC node according to any one of the embodiments of this application. As can be appreciated, the memory 720 may be any non-transitory computer-readable medium without limitation, such as FLASH memory, optical or magnetic disks, solid-state drivers, and the like. The memory 720, or a portion thereof, may also be removable as one of ordinary skill would recognize.

The processor 710 (or CPU) invokes the program instructions stored in the memory 720, and the processor 710 is configured to perform, according to the obtained program instructions, the method for selecting a MEC node according to any one of the embodiments of this application.

Based on the foregoing exemplary embodiments, an exemplary embodiment of this disclosure provides a non-transitory computer-readable storage medium, storing a computer program, the computer program, when executed by a processor, implementing the method for selecting a MEC node according to any one of the method embodiments described above.

A person skilled in the art can understand that the exemplary embodiments of this disclosure may be provided as a method, a system, or a computer program product. Therefore, this application may use a form of hardware-only embodiments, software-only embodiments, or embodiments combining software and hardware. Moreover, this application may use a form of a computer program product that is implemented on one or more computer-usable storage media (including but not limited to a disk memory, a CD-ROM, an optical memory, and the like) that include computer-usable program code.

In an exemplary embodiment, a computer program product is further provided, when executed, the computer program product is configured to implement the method for selecting a MEC node provided in the foregoing embodiments.

This disclosure is described with reference to flowcharts and/or block diagrams of the method, the device (system), and the computer program product according to the exemplary embodiments of this disclosure. It is to be understood that computer program instructions can implement each procedure and/or block in the flowcharts and/or block diagrams and a combination of procedures and/or blocks in the flowcharts and/or block diagrams. The computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

The computer program instructions may be alternatively stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may further be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Although exemplary embodiments of this disclosure have been described, once a person skilled in the art learns of the basic creative concept, additional changes and modifications can be made to the exemplary embodiments without departing from the scope of this disclosure. Therefore, the following claims are intended to be construed as to cover the exemplary embodiments and all changes and modifications falling within the scope of this application.

Obviously, a person skilled in the art can make various modifications and variations to the exemplary embodiments of this disclosure without departing from the spirit and scope of the disclosure. In this case, if the modifications and variations made to the exemplary embodiments of this disclosure fall within the scope of the claims of this application and equivalent technologies thereof, this disclosure also intends to include the changes and variations.

What is claimed is:

1. A method for selecting a mobile edge computing (MEC) node, performed by an edge cloud gateway, the edge cloud gateway being disposed in a system for selecting a MEC node, the system including at least a user plane function (UPF) and the edge cloud gateway, the method comprising:

receiving, by processing circuitry of the edge cloud gateway, a first HyperText Transfer Protocol (HTTP) service request forwarded by the UPF, a destination address of the first HTTP service request being an edge-application virtual Internet Protocol address (VIP);

determining a corresponding MEC processing server according to the first HTTP service request and a preset offloading policy; and offloading the first HTTP service request to the corresponding MEC processing server.

2. The method according to claim 1, wherein the system further comprises a global server load balance (GSLB), and before the receiving, by the processing circuitry of the edge cloud gateway, a first HTTP service request forwarded by the UPF, the method further comprises:

receiving a second HTTP service request forwarded by the UPF, a destination address of the second HTTP service request being a global edge gateway IP address, the global edge gateway IP address being returned to a terminal in a case that the GSLB receives a domain name system (DNS) request transmitted by the terminal, the global edge gateway IP address being an IP address that identifies service acceleration;
obtaining the edge-application VIP from the GSLB based on the second HTTP service request; and
transmitting a redirection response to the terminal, a redirection address in the redirection response being the edge-application VIP, to cause the terminal to transmit the first HTTP service request based on the redirection response.

3. The method according to claim 2, wherein the obtaining the edge-application VIP from the GSLB comprises:
transmitting a first HTTP DNS request to the GSLB, the first HTTP DNS request comprising at least a service acceleration domain name and a source address, the source address being an IP address of the edge cloud gateway; and
receiving a first HTTP DNS response returned by the GSLB, the first HTTP DNS response comprising the edge-application VIP, the edge-application VIP being determined by the GSLB according to the IP address of the edge cloud gateway and the service acceleration domain name in the first HTTP DNS request.

4. The method according to claim 2, wherein the redirection response is an HTTP 302 redirection response.

5. The method according to claim 2, wherein the first HTTP service request is transmitted in a case that the terminal receives a second HTTP DNS response forwarded by the UPF, the second HTTP DNS response being returned in a case that the GSLB receives a second HTTP DNS request forwarded by the UPF, the second HTTP DNS request being forwarded in a case that the UPF obtains through resolution that a destination address in the second HTTP DNS request transmitted by the terminal is an IP address of the GSLB; and
the second HTTP DNS response comprises at least the edge-application VIP, the edge-application VIP being determined by the GSLB according to a service acceleration domain name in the second HTTP DNS request.

6. The method according to claim 2, wherein the UPF, the edge cloud gateway, and the GSLB respectively correspond to different pre-configuration rules, the pre-configuration rule representing a routing configuration for service acceleration.

7. The method according to claim 6, wherein the UPF corresponds to a first pre-configuration rule, the first pre-configuration rule comprising at least: forwarding an HTTP service request of which a destination address is the global edge gateway IP address to the edge cloud gateway; or forwarding an HTTP service request of which a destination address is the edge-application VIP to the edge cloud gateway;
the edge cloud gateway corresponds to a second pre-configuration rule, the second pre-configuration rule comprising at least: the preset offloading policy; and
the GSLB corresponds to a third pre-configuration rule, the third pre-configuration rule comprising at least: for a DNS request of which a domain name is a preset service acceleration domain name, returning the global edge gateway IP address; or for an HTTP DNS request of which a domain name is a preset service acceleration domain name, returning a corresponding edge-application VIP based on a source address and the service acceleration domain name in the HTTP DNS request, the source address being the IP address of the edge cloud gateway.

8. The method according to claim 7, wherein the UPF corresponds to a fourth pre-configuration rule, the fourth pre-configuration rule comprising at least: forwarding an HTTP service request of which a destination address is the edge-application VIP to the edge cloud gateway.

9. The method according to claim 8, wherein the GSLB corresponds to a fifth pre-configuration rule, the fifth pre-configuration rule comprising at least: for an HTTP DNS request of which a domain name is a preset service acceleration domain name, returning a corresponding edge-application VIP based on the service acceleration domain name in the HTTP DNS request.

10. The method according to claim 8, wherein the first pre-configuration rule, the second pre-configuration rule, or the fourth pre-configuration rule is configured by a configured edge controller or is locally configured,
the edge controller being configured in a cloud center of a core network in the system, and being communicably connected to the edge cloud gateway and the UPF respectively.

11. The method according to claim 1, wherein the edge cloud gateway is configured on a MEC node side or an edge data center (DC) side of the system.

12. An edge cloud gateway for selecting a mobile edge computing (MEC) node, the edge cloud gateway being disposed in a system for selecting a MEC node, the system including at least a user plane function (UPF) and the edge cloud gateway, the edge cloud gateway comprising:
processing circuitry configured to
receive a first HyperText Transfer Protocol (HTTP) service request forwarded by the UPF, a destination address of the first HTTP service request being an edge-application virtual Internet Protocol address (VIP);
determine a corresponding MEC processing server according to the first HTTP service request and a preset offloading policy; and
offload the first HTTP service request to the corresponding MEC processing server.

13. A system for selecting a mobile edge computing (MEC) node, comprising:
a user plane function (UPF); and
an edge cloud gateway, wherein:
the UPF is configured to receive a first HyperText Transfer Protocol (HTTP) service request transmitted by a terminal, and forward the first HTTP service request to the edge cloud gateway in response to determining that a destination address in the first HTTP service request is an edge-application virtual Internet Protocol address (VIP); and
the edge cloud gateway is configured to receive the first HTTP service request forwarded by the UPF, determine a corresponding MEC processing server based on the first HTTP service request and a preset offloading policy, and offload the first HTTP service request to the corresponding MEC processing server.

14. The system according to claim 13, further comprising a global server load balance (GSLB), wherein:
the GSLB is configured to return a global edge gateway IP address to the terminal in a case that the GSLB receives a domain name system (DNS) request transmitted by the terminal and it is determined that a domain name in the DNS request is a preset service acceleration domain name, the global edge gateway IP address being an IP address that identifies service acceleration.

15. The system according to claim 14, wherein the UPF is further configured to receive a second HTTP service request transmitted by the terminal, and forward the second HTTP service request to the edge cloud gateway in response to determining that a destination address in the second HTTP service request is the global edge gateway IP address.

16. The system according to claim 15, wherein the edge cloud gateway is further configured to receive the second HTTP service request forwarded by the UPF, obtain the edge-application VIP from the GSLB based on the second HTTP service request, and transmit a redirection response to the terminal, a redirection address in the redirection response being the edge-application VIP, so that the terminal is caused to transmit the first HTTP service request based on the redirection response.

17. The system according to claim 14, wherein during obtaining the edge-application VIP from the GSLB, the edge cloud gateway is specifically configured to:
    transmit a first HTTP DNS request to the GSLB, the first HTTP DNS request comprising at least a service acceleration domain name and a source address, the source address being an IP address of the edge cloud gateway; and
    receive a first HTTP DNS response returned by the GSLB, the first HTTP DNS response comprising the edge-application VIP, the edge-application VIP being determined by the GSLB according to the IP address of the edge cloud gateway and the service acceleration domain name in the first HTTP DNS request.

18. The system according to claim 13, further comprising a GSLB, wherein the GSLB is configured to: return a second HTTP DNS response in response to receiving a second HTTP DNS request forwarded by the UPF, the second HTTP DNS request being forwarded in a case that the UPF obtains through resolution that a destination address in the second HTTP DNS request transmitted by the terminal is an IP address of the GSLB, the second HTTP DNS response comprising at least the edge-application VIP, the edge-application VIP being determined by the GSLB according to a service acceleration domain name in the second HTTP DNS request.

19. The system according to claim 18, wherein the UPF is further configured to: receive the second HTTP DNS response returned by the GSLB, and forward the second HTTP DNS response to the terminal, so that the terminal is caused to transmit the first HTTP service request based on the edge-application VIP in the second HTTP DNS response.

20. A non-transitory computer-readable medium encoded with computer-readable instructions that, when executed by a computer, cause the computer to perform the method according to claim 1.

* * * * *